United States Patent
Marshall et al.

(10) Patent No.: US 10,402,789 B2
(45) Date of Patent: Sep. 3, 2019

(54) ATTENDANCE TRACKING VIA DEVICE PRESENCE

(71) Applicant: AirWatch LLC, Atlanta, GA (US)

(72) Inventors: John Marshall, Atlanta, GA (US); Christian B. Sorensen, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 806 days.

(21) Appl. No.: 14/838,444

(22) Filed: Aug. 28, 2015

(65) Prior Publication Data
US 2015/0371194 A1    Dec. 24, 2015

Related U.S. Application Data

(63) Continuation of application No. 13/871,014, filed on Apr. 26, 2013, now Pat. No. 9,123,031.

(51) Int. Cl.
*G06Q 10/10* (2012.01)
*G06Q 40/00* (2012.01)

(52) U.S. Cl.
CPC ......... *G06Q 10/1091* (2013.01); *G06Q 40/10* (2013.01); *G06Q 40/12* (2013.12)

(58) Field of Classification Search
CPC ..... G06Q 10/1091; G06Q 40/10; G06Q 40/12
USPC .................................................... 705/32, 30
See application file for complete search history.

(56) References Cited

U.S. PATENT DOCUMENTS

| | | |
|---|---|---|
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,560,772 B1 | 5/2003 | Slinger |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,668 B2 | 6/2006 | Porad |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |

(Continued)

*Primary Examiner* — Florian M Zeender
*Assistant Examiner* — Christopher R Buchanan
(74) *Attorney, Agent, or Firm* — Thomas Horstemeyer, LLP (57) ABSTRACT

Attendance tracking via mobile devices may be provided. Once a meeting begins, a plurality of mobile devices present at the meeting may be identified. An attendance report for a plurality of attendees at the meeting may be provided based on the presence of each of the identified plurality of mobile devices.

20 Claims, 3 Drawing Sheets

(56) References Cited

U.S. PATENT DOCUMENTS

| | | | |
|---|---|---|---|
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,099,332 B2 | 1/2012 | Lemay et al. | |
| 8,117,344 B2 | 2/2012 | Mendez et al. | |
| 8,150,431 B2 | 4/2012 | Wolovitz et al. | |
| 8,433,620 B2 | 4/2013 | Futty et al. | |
| 9,251,506 B2* | 2/2016 | Benjamin | G06Q 10/109 |
| 9,723,035 B1* | 8/2017 | Siddiqui | H04L 65/403 |
| 9,727,923 B2* | 8/2017 | Teh | G06Q 40/125 |
| 2002/0013721 A1 | 1/2002 | Dabbiere et al. | |
| 2002/0049644 A1 | 4/2002 | Kargman | |
| 2003/0110084 A1 | 6/2003 | Eberhard et al. | |
| 2003/0187798 A1 | 10/2003 | McKinley et al. | |
| 2003/0204716 A1 | 10/2003 | Rockwood et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0246192 A1 | 11/2005 | Jauffred et al. | |
| 2006/0095376 A1 | 5/2006 | Mitchell et al. | |
| 2006/0190984 A1 | 8/2006 | Heard et al. | |
| 2007/0033397 A1 | 2/2007 | Phillips, II et al. | |
| 2007/0136492 A1 | 6/2007 | Blum et al. | |
| 2007/0156897 A1 | 7/2007 | Lim | |
| 2007/0174433 A1 | 7/2007 | Mendez et al. | |
| 2007/0255786 A1* | 11/2007 | Mock | G06Q 10/109 709/204 |
| 2007/0288637 A1 | 12/2007 | Layton et al. | |
| 2008/0133712 A1 | 6/2008 | Friedman et al. | |
| 2008/0134305 A1 | 6/2008 | Hinton et al. | |
| 2008/0201453 A1 | 8/2008 | Assenmacher | |
| 2008/0316939 A1 | 12/2008 | Shimamura et al. | |
| 2009/0036111 A1 | 2/2009 | Danford et al. | |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0265280 A1* | 10/2009 | Taneja | G06Q 10/109 705/80 |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0037151 A1 | 2/2010 | Ackerman et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299390 A1* | 11/2010 | Alameh | G06F 3/017 709/204 |
| 2010/0299719 A1 | 11/2010 | Burks et al. | |
| 2010/0317371 A1 | 12/2010 | Westerinen et al. | |
| 2011/0004941 A1 | 1/2011 | Mendez et al. | |
| 2011/0014929 A1 | 1/2011 | Moshfeghi et al. | |
| 2011/0040598 A1 | 2/2011 | Brady et al. | |
| 2011/0082900 A1 | 4/2011 | Nagpal et al. | |
| 2011/0113062 A1 | 5/2011 | Quinlan et al. | |
| 2011/0145932 A1 | 6/2011 | Nerger et al. | |
| 2011/0153779 A1 | 6/2011 | Mendez et al. | |
| 2011/0153799 A1 | 6/2011 | Ito | |
| 2011/0167357 A1* | 7/2011 | Benjamin | H04L 12/1818 715/753 |
| 2011/0167474 A1 | 7/2011 | Sinha et al. | |
| 2011/0202589 A1 | 8/2011 | Piernot et al. | |
| 2011/0225252 A1 | 9/2011 | Bhat et al. | |
| 2011/0270799 A1 | 11/2011 | Muratov | |
| 2011/0276805 A1 | 11/2011 | Nagpal et al. | |
| 2011/0296186 A1 | 12/2011 | Wong et al. | |
| 2011/0320552 A1 | 12/2011 | Friedman et al. | |
| 2012/0005578 A1 | 1/2012 | Hawkins | |
| 2012/0015644 A1 | 1/2012 | Danford et al. | |
| 2012/0102392 A1 | 4/2012 | Reesman et al. | |
| 2012/0185291 A1* | 7/2012 | Ramaswamy | G06Q 10/1095 705/7.19 |
| 2012/0198547 A1 | 8/2012 | Fredette et al. | |
| 2012/0221963 A1* | 8/2012 | Motoyama | G06F 21/6218 715/753 |
| 2013/0018727 A1 | 1/2013 | Earles et al. | |
| 2013/0110565 A1* | 5/2013 | Means, Jr. | G06Q 10/06 705/7.11 |
| 2013/0148789 A1* | 6/2013 | Hillier | H04M 3/563 379/32.01 |
| 2013/0152169 A1 | 6/2013 | Stuntebeck | |
| 2013/0317944 A1* | 11/2013 | Huang | G01S 5/0252 705/26.61 |
| 2013/0344851 A1* | 12/2013 | Brdiczka | G01S 5/0278 455/414.1 |

\* cited by examiner

ATTENDANCE TRACKING VIA DEVICE PRESENCE

CROSS-REFERENCE TO RELATED APPLICATION

This application claims the benefit of and is a continuation of U.S. application Ser. No. 13/871,014, entitled "Attendance Tracking Via Device Presence" and filed on Apr. 26, 2013, which is hereby incorporated by reference herein in its entirety.

BACKGROUND

Modern gatherings of students and professionals nearly always include those attendees' mobile devices. For example, employees bring their laptops, tablets, and cellular phones to meetings while students bring such devices to class. Conventionally, there has been no way to leverage these habits to track attendance at required functions, however, and most situations continue to rely on self-reporting of attendance or paper records.

SUMMARY

This Summary is provided to introduce a selection of concepts in a simplified form that are further described below in the Detailed Description. This Summary is not intended to identify key features or essential features of the claimed subject matter nor is this Summary intended to be used to limit the claimed subject matter's scope.

Attendance tracking via mobile devices may be provided. Once a meeting begins, a plurality of mobile devices present at the meeting may be identified. An attendance report for a plurality of attendees at the meeting may be provided based on the presence of each of the identified plurality of mobile devices.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Attendees at educational and professional gatherings, such as classes or meetings, often have their mobile devices with them. These devices may allow for tracking and identification of those in attendance at such gatherings. For example, each student in a class may log in to a wireless router (e.g., a "hotspot") associated with the class and/or may register their device with a communication signal, such as a near-field communication (NFC), wireless network, radio frequency identifier (RFID), or Bluetooth® signal, as they enter the room. Professional attendees at a meeting may similarly register their presence. Other options for registering presence may include logging in to a specific application and/or entering a code associated with the meeting into a web-based form. For example, attorneys at a continuing education conference may log into an application associated with their bar association or the conference host and enter a code associated the conference and/or each session of the conference.

In some embodiments, a geographical area may be defined around the meeting area (e.g., a geo-fence) and devices associated with the attendees may report their GPS location as being within the geo-fence. Conversely, devices for expected attendees of the meeting may be queried when the meeting begins and/or at various times before and/or after the start time to identify the devices' locations and determine whether the devices are present at the meeting location or not.

Safeguards against fraudulent attendance counts may also be provided. For example, the mobile devices may require a personalized identification from each user, such as password or security question answer. Devices equipped with the appropriate hardware may receive uniquely identifying biometric identification, such as fingerprints, images, voiceprints, and/or retina scans. In some embodiments, device locations may be triangulated to determine whether a single person is in possession of multiple devices that are registered as attendees.

In some embodiments, an image of the attendees may be captured, such as by a webcam, camera, video recorder, a motion sensor (e.g., a Microsoft® Kinect® device), etc. The image may be analyzed to count the number of attendees, and any discrepancy with the number of devices registering attendance may be investigated. For example, someone actually in attendance may have forgotten their device or someone not in attendance may have sent their device with another attendee.

An attendance report detailing the attendees who are present and/or expected attendees who were late and/or absent may be prepared. These reports may be further collated to provide information over longer periods than a single meeting. For example, attendance at each session of a conference may be tracked for the conference attendees, or attendance at classes by a student over a day, week, month, quarter, semester, year, etc. may be reported.

In some embodiments, a meeting management application may control the use of resources by devices via an electronic meeting and/or other forms of electronic communication.

The management application can identify multiple entities required as in attendance before communicating electronic content. An entity can include a logical representation of any participant in a meeting. The management application may identify a given entity based on any suitable criteria. Non-limiting examples of suitable criteria include (but are not limited to) credentials associated with a particular user (such as, but not limited to, a user name and/or other identifier), one or more identifiers associated with a computing device used to access the electronic meeting (such as, but not limited to, a hardware identifier or network address of the computing device), and/or based on a pairing of a user credential and a device identifier. The required entities may be a subset of all entities authorized to access the electronic meeting. In the absence of all of the required entities, communication of electronic content via the electronic meeting may be restricted and/or disallowed.

Attendance at the meeting may comprise being physically present in the meeting location and/or accessing the meeting remotely. A management application can authorize communication of the electronic content among the required entities and other authorized entities via the electronic meeting based on determining that each required entity is present in the meeting room and/or accessing the meeting remotely.

Figure 1:
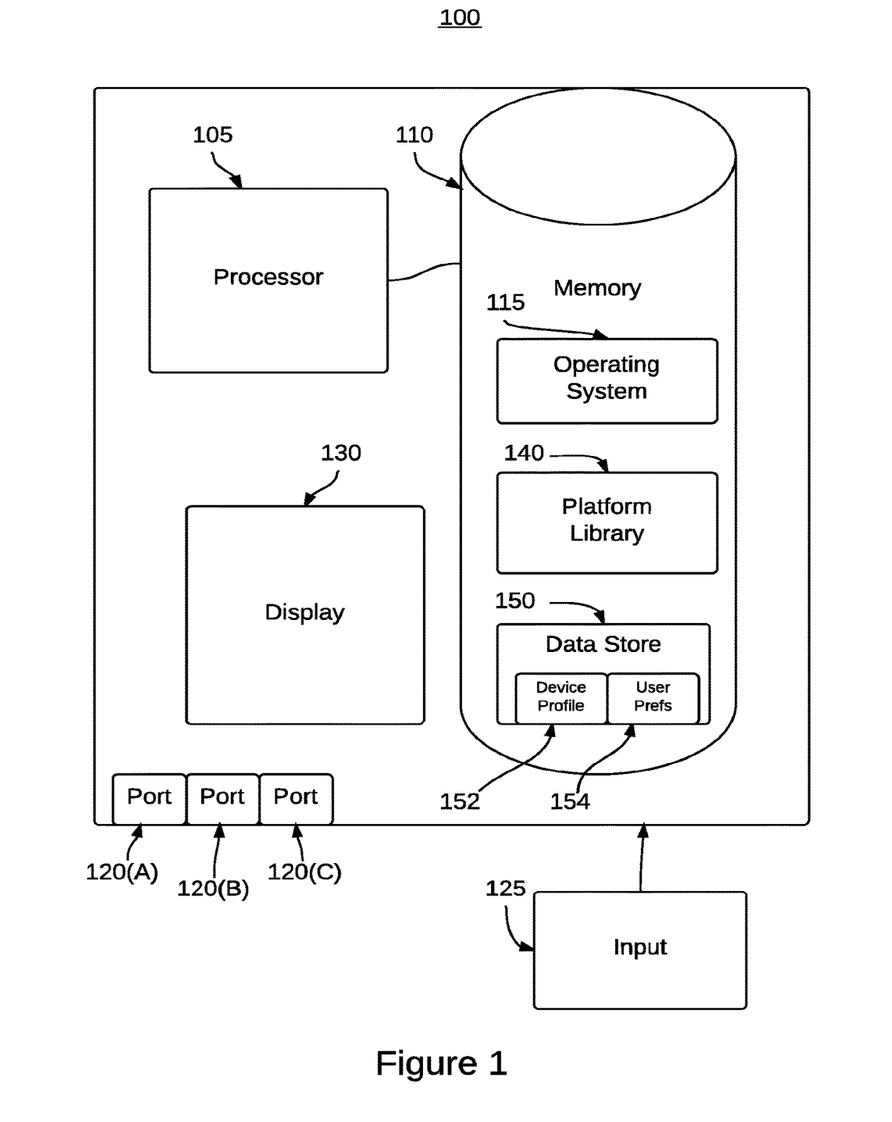
FIG. 1 is a block diagram of a user device.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or another device with like capability.

User device 100 may store in a data store 150 a device profile 152 and a plurality of user preferences 154. Device profile 152 may comprise an indication of the current position of user device 100 and/or indications of the hardware, software, and security attributes, which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. User preferences 154 may comprise a listing of factors that may affect the experience of the user. In particular, user preferences 154 may include indications of the user's age, gender, bodily traits, preferred resource types, preferred venue resources, and combinations thereof.

Figure 2:
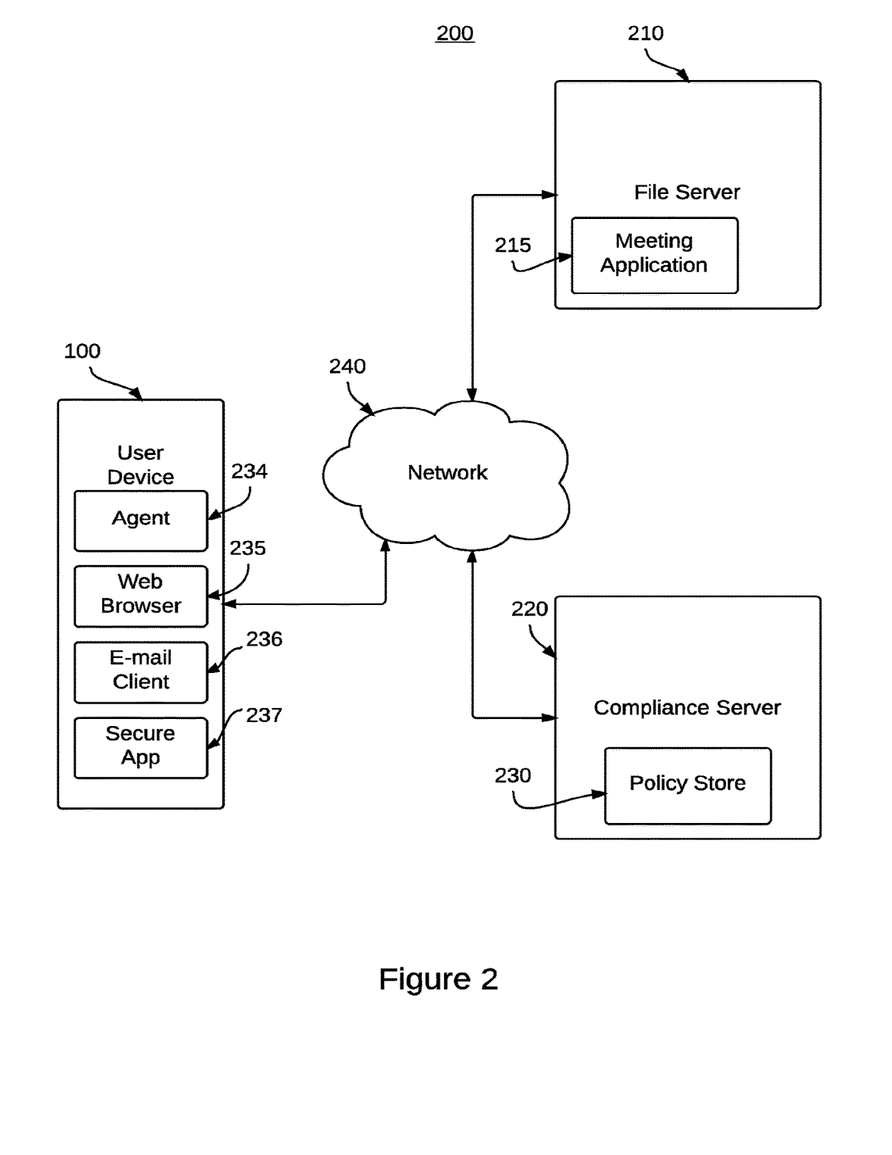
FIG. 2 is a block diagram of an operating environment.

FIG. 2 is a block diagram view of an operating environment 200 comprising user device 100 in communication with a file server 210, which may execute a meeting management application 215, and a compliance server 220 via a network 240. The meeting management application may be operative to schedule and/or distribute content for an electronic meeting such as that described in co-pending U.S. application Ser. No. 13/828,922, entitled "Controlling Electronically Communicated Resources" and assigned to the assignee of the current application, which is hereby incorporated by reference in its entirety. The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as described herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise a policy store 230 comprising a plurality of compliance rules and/or policies that may be applicable to user device 100. While the policy store 230 is shown as within the compliance server 220, the policy store 230 may alternately be within the user device 100 and/or remotely located on the file server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

In some embodiments, an agent application 234 executed on user device 100 may make the compliance determination based on the device profile, credentials, and/or user preferences. For instance, the agent application 234 may monitor calls by applications, such as a web browser 235, an e-mail client 236, and/or a secure application 237, on user device 110 to the operating system 115 of user device 100 to determine whether user device 110 seeks to perform functionality associated with a given compliance rule. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 110 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the agent 234 may perform a set of ordered operations to accomplish a requested function. These operation sets may be defined by the user device 100 and/or compliance server 220 and may comprise one and/or more operations to determine whether the user device 100 is in compliance with policies from policy store 230. The agent 234 may control at least one respective computing resource of the user device 100. The operations may include configuring at least one respective computing resource of the user device 100 such as restricting access to at least one resource managed by the agent 234.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
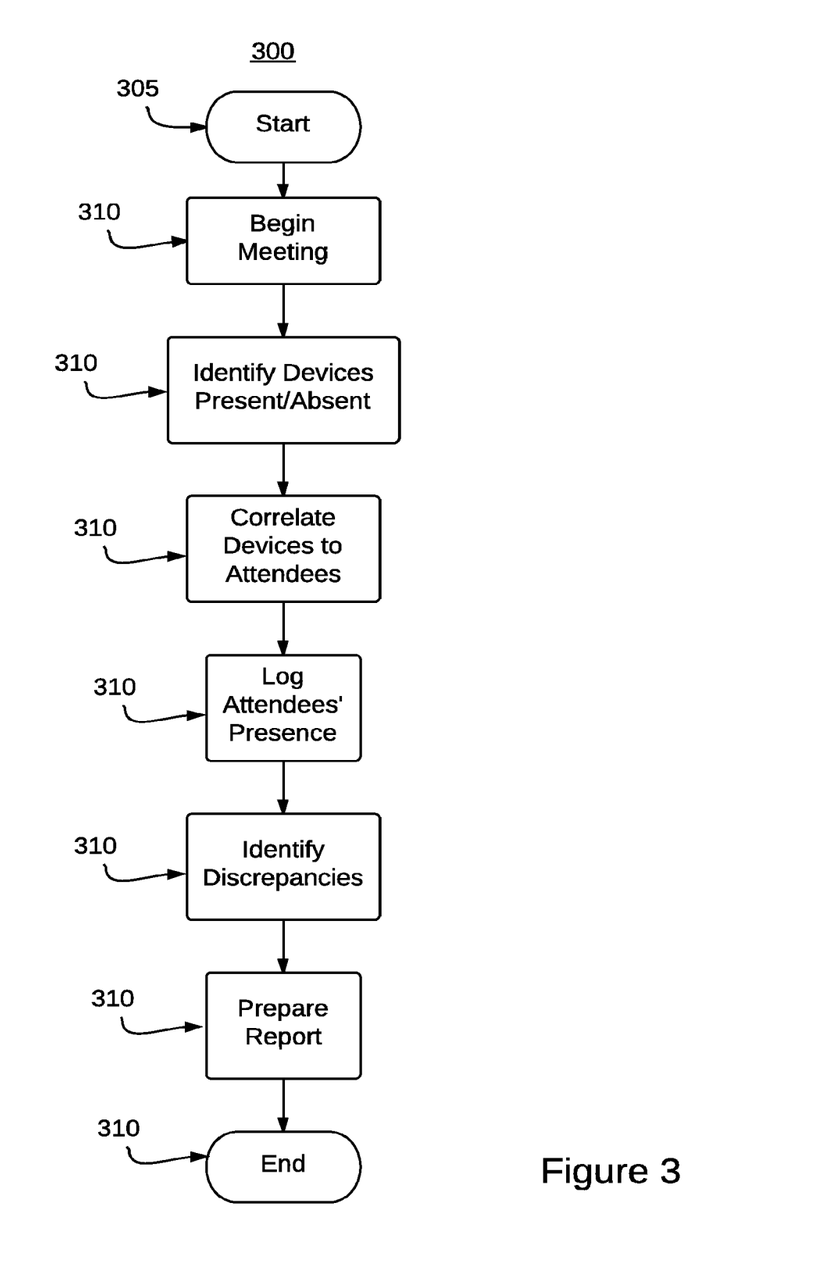
FIG. 3 is a flow chart illustrating a method for providing attendance tracking via device presence.

FIG. 3 is a flow chart setting forth the general stages involved in a method 300 consistent with embodiments of this disclosure for providing attendance tracking via device presence. Method 300 may be implemented using elements of operating environment 200 as described above. Ways to implement the stages of method 300 will be described in greater detail below. Method 300 may begin at starting block 305 and proceed to stage 310 where user device 100 may begin a meeting. For example, a meeting organizer's device may comprise a master copy of a calendar event to which other users have been invited. For another example, meeting management application 215 may track scheduled meetings and/or classes and may initiate an electronic meeting at an appointed start time.

From stage 310, method 300 may advance to stage 315 where user device 100 may identify a plurality of devices associated with the meeting. The absence or presence may comprise an associated user's physical presence at the meeting location and/or electronic attendance, such as via a teleconference or webcam session. Detection of the devices may take numerous forms, such as whether the devices are logged into a particular server, network, and/or wireless router/hotspot, whether the user is logged into an application associated with the meeting (e.g., a classroom or conferencing application), whether the device has registered and/or been identified via a communication signal such as radio frequency identification (RFID), wireless networking, Bluetooth, and/or near-field communication (NFC) signal, and/or whether the device has submitted a code associated with the meeting.

For example, a professor may have a code written on a blackboard associated with the day's lecture that the students may submit via a web page, mobile application, SMS, e-mail, and/or any other communication medium. For another example, each attendee may tap their device against an RFID or NFC reader as they enter the meeting location. For yet another example, devices within a geo-fence associated with the meeting location may be polled, such as over a wireless network, for identifying information. As a further example, user device 100 may create an ad-hoc network, such as via 802.11 and/or Bluetooth, to which attendee devices may connect and identify themselves and/or be identified by user device 100. In some embodiments, devices may be detected at different times throughout the meeting's duration to determine whether any devices arrived late and/or left early.

From stage 315, method 300 may advance to stage 320 where user device 100 may correlate the identified devices to attendees. For example, devices may comprise uniquely identifying information such as serial numbers, text names, MAC and/or IP addresses, assigned identifier numbers and/or strings, RFID chip codes, etc. For another example, the devices may submit identification information by transmitting an identify certificate and/or having the user fill in a form via an application and/or web page.

From stage 320, method 300 may advance to stage 325 where user device 100 may create an attendance log. The log may be stored on user device 100 and/or transmitted to a network location such as file server 210 and/or compliance server 220. The log may comprise identification information for each device, an identity of a correlated user, and/or the absence of any devices/users expected to be in attendance. The log may also comprise information about any devices present that were not identified and/or correlated with a known user. The log may also comprise information about any devices that arrived late or departed early.

In some embodiments, the log may indicate whether the correlated identity is strongly trusted, such as where each device submits an authenticated identity certificate requiring each attendee to enter an individually identifying characteristic such as a passcode and/or biometric data, weakly trusted, such as where each device comprises a unique hardware identifier, and/or untrusted, such as where the identity correlation comes from data submitted by the user e.g., via a web page form. In some embodiments, the log may comprise a list of all invited and/or expected attendees and whether an associated device was absent from the meeting. An interface for a meeting organizer (e.g., a class professor) may be provided to allow for manual entries to the log, such as for students who forgot to bring their device.

From stage 325, method 300 may advance to stage 330 where user device 100 may identify any discrepancies between the identified devices and the correlated users. For example, user device 100 may receive an image of the attendees at the meeting and perform a count of the number of attendees to determine whether there are more devices than attendees, or vice versa. The attendee devices may also be triangulated within the meeting location to determine whether one user may be carrying more than one device. For another example, some and/or all of the devices may be equipped with biometric sensors to verify that each device is associated with a unique and/or authorized user. For yet another example, devices equipped with microphones may be able to capture voices in attendance at the meeting. The voices may be used to provide a count of individuals at the meeting and/or to identify the individuals present. Any discrepancies may be logged as described above with respect to stage 325.

From stage 330, method 300 may advance to stage 335 where user device 100 may prepare an attendance report. For example, the log may be used to generate a list of all attendees present at the meeting. Logs may also be combined into reports, such as by providing a teacher or school principal an overview of all students who were absent or late to a class over a particular time period such as a day, week, month, term, semester, and/or year. Method 300 may then end at stage 350.

An embodiment consistent with the disclosure may comprise a system for providing attendance tracking via device presence. The system may comprise a memory storage and a processing unit coupled to the memory storage. The processing unit may be operative to determine that a meeting has begun, identify a plurality of mobile devices present at the meeting, and log the attendance of a plurality of attendees based on the presence of each of the identified plurality of mobile devices. The processing unit may be further operative to compare the identified plurality of mobile devices to a list of expected attendees, determine whether a mobile device associated with at least one of the expected attendees is not present at the meeting, and, if so, log the at least one of the expected attendees as absent. Identifying the plurality of mobile devices may comprise, for example, identifying devices present within a configured geographic area receiving a communication and/or verification signal from each of the plurality of mobile devices. The processing unit may be further operative to receive a count of the plurality of attendees, determine whether the count of the plurality of attendees differs from a count of the plurality of identified mobile devices, and, if so, include the difference between the count of the plurality of attendees and the count of the plurality of identified mobile devices in the attendance report.

Another embodiment consistent with the disclosure may comprise a system for providing attendance tracking via device presence. The system may comprise a memory storage and a processing unit coupled to the memory storage. The processing unit may be operative to identify a plurality of devices present at a meeting, identify a number of attendees present at the meeting, and prepare an attendance report for the meeting comprising a correlation between the plurality of devices present at the meeting location and the number of attendees present at the meeting location. The processing unit may be operative to receive a count of the number of attendees from an organizer of the meeting and/or to receive a digital image of a location of the meeting and analyze the digital image to count the number of attendees present at the meeting. The processing unit may be further operative to determine whether the count of the number of attendees differs from a count of the plurality of devices and identify at least one discrepancy between at least one of the plurality of devices and at least one of the attendees. Being operative to identify the at least one discrepancy between the at least one of the plurality of devices and the at least one of the attendees may comprise the processing unit being operative to verify each of the attendees present at the meeting according to an authentication and compare each of the verified attendees to a profile associated with each of the plurality of devices. For example, each device may have an identity profile and/or contact record installed identifying the user. The profile may also comprise device and/or user specific identifying information such as an identity certificate.

Yet another embodiment consistent with the disclosure may comprise a system for providing attendance tracking via device presence. The system may comprise a memory storage and a processing unit coupled to the memory storage. The processing unit may be operative to identify a plurality of registered devices present at a meeting, identify a plurality of attendees present at the meeting, and provide an attendance report for the meeting comprising a correlation between the plurality of registered devices present at the meeting location and the number of attendees present at the meeting location. The processing unit may be further operative to receive a plurality of authentications associated with the plurality of attendees, associate the plurality of authentications with at least some of the plurality of attendees, and determine whether at least one of the plurality of authentications is not associated with at least one of the plurality of attendees. The plurality of authentications may comprise, for example a login, a password, a meeting code, a fingerprint, a retina scan, a voiceprint, biometric data, an identity certificate, and an image.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in any code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   defining a geographical area associated with a venue, the geographical area comprising an area within which presence of a respective mobile device from a plurality of mobile devices identifies presence at the venue;
   receiving a communication signal from the respective mobile device on a particular wireless network in response to a query, the communication signal comprising an authentication of the respective mobile device based on identification information entered through a user interface on the respective mobile device;
   determining that a required subset of a plurality of expected attendees is present at the venue based on the identification information and the respective mobile device being present at the venue;
   creating an attendance log based at least in part on the communication signal received from the respective mobile device; and
   authorizing communication of electronic content to the respective mobile device based on the required subset of the plurality of expected attendees being present at the venue.

2. The method of claim 1, wherein the communication signal comprises a wireless network signal received at a wireless network transceiver associated with a location of the venue.

3. The method of claim 1, further comprising obtaining, for the respective mobile device, a global positioning system (GPS) location associated with the respective mobile device and determining that the respective mobile device is within the geographical area.

4. The method of claim 1, further comprising:
   determining a number of attendees based on a count of persons present at the venue based on an analysis of an image of the venue or audio captured at the venue;

determining whether a discrepancy exists between the number of attendees and a number of the plurality of mobile devices; and recording the discrepancy in the attendance log in response to determining that the discrepancy exists.

5. The method of claim 1, wherein the communication signal comprises a near-field communications (NFC) signal received at an NFC receiver associated with a location of the venue.

6. The method of claim 1, wherein the communication signal comprises a biometric identification.

7. The method of claim 1, wherein receiving the communication signal from the respective mobile device comprises receiving a verification signal from an application executed by the respective mobile device.

8. The method of claim 7, wherein the verification signal comprises a venue identifier.

9. A system comprising:
at least one computing device; and
a plurality of computer instructions executable by the at least one computing device, wherein when executed, cause the at least one computing device to at least:
define a location of a meeting comprising an area within which presence of a respective mobile device from a plurality of mobile devices identifies presence at the meeting;
receive a communication signal from the respective mobile device on a particular wireless network in response to a query, the communication signal comprising an authentication of the respective mobile device based on identification information entered through a user interface on the respective mobile device;
determine that a required subset of a plurality of expected attendees is present at the meeting based on the identification information and the respective mobile device being present at the meeting; and
authorize communication of electronic content to the respective mobile device based on the required subset of the plurality of expected attendees being present at the meeting.

10. The system of claim 9, wherein a number of attendees at the meeting is identified by obtaining at least one digital image of the location of the meeting and performing an image analysis on the at least one digital image.

11. The system of claim 10, wherein a result of the image analysis comprises the number of attendees appearing within the at least one digital image.

12. The system of claim 11, wherein the plurality of computer instructions are further configured to cause the computing device to at least determine whether a discrepancy exists between the number of attendees appearing within the at least one digital image and a number of the plurality of mobile devices.

13. The system of claim 9, wherein the plurality of computer instructions are further configured to cause the computing device to at least:
create an ad-hoc network associated with the meeting;
determine, based upon the communication signal, whether the respective mobile device is connected to the ad-hoc network; and
transmit the electronic content to the respective mobile device in response to a determination that the at least one of the respective mobile device is connected to the ad-hoc network.

14. The system of claim 9, wherein the communication signal comprises a wireless network signal at a wireless network transceiver associated with the location of the meeting.

15. The system of claim 9, wherein the area corresponds to a geo-fence associated with the location of the meeting.

16. A non-transitory computer-readable medium having a plurality of computer instructions executable by at least one computing device wherein, when executed, cause the at least one computing device to:
define a geographical area associated with a meeting, the geographical area comprising an area within which presence of a respective mobile device from a plurality of mobile devices identifies presence at the meeting;
receive a communication signal from the respective mobile device on a particular wireless network in response to a query, the communication signal comprising an authentication of the respective mobile device based on identification information entered through a user interface on the respective mobile device;
determine that a required subset of a plurality of expected attendees is present at the meeting based on the identification information and the respective mobile device being present at the meeting; and
authorize communication of electronic content to the respective mobile device based on the required subset of the plurality of expected attendees being present at the meeting.

17. The non-transitory computer-readable medium of claim 16, wherein the plurality of computer instructions further cause the at least one computing device to:
receive a plurality of authentications obtained in response to a plurality of requests to authenticate the respective mobile device;
compare a number of the plurality of authentications to a number of the expected attendees; and
authorize communication of the electronic content in response to a determination that the number of the plurality of authentications corresponds to the number of the expected attendees.

18. The non-transitory computer-readable medium of claim 17, wherein the plurality of authentications comprises at least one of the following: a login, a password, a meeting code, a fingerprint, an identity certificate, a retina scan, a voiceprint, or an image.

19. The non-transitory computer-readable medium of claim 16, wherein the communication signal is received in response to tapping the respective mobile device against an RFID reader located within the geographical area.

20. The non-transitory computer-readable medium of claim 16, wherein the plurality of computer instructions further cause the at least one computing device determine that a location of the respective mobile device indicates that an attendee is in possession of multiple mobile devices.

* * * * *